US005144334A

United States Patent [19]

Suzuki et al.

[11] Patent Number: 5,144,334

[45] Date of Patent: Sep. 1, 1992

[54] THERMOSENSITIVE RECORDING METHOD USING SUBLIMATION-TYPE THERMOSENSITIVE IMAGE RECEIVING RECORDING MEDIUM

[75] Inventors: Akira Suzuki, Mishima; Hidehiro Mochizuki, Numazu; Masaru Shimada, Shizuoka; Hiroyuki Uemura; Naoya Morohoshi, both of Numazu, all of Japan

[73] Assignee: Ricoh Company, Ltd., Tokyo, Japan

[21] Appl. No.: 476,596

[22] Filed: Feb. 7, 1990

[30] Foreign Application Priority Data

| | | | |
|---|---|---|---|
| Feb. 16, 1989 | [JP] | Japan | 1-37365 |
| Feb. 28, 1989 | [JP] | Japan | 1-47673 |
| Jul. 11, 1989 | [JP] | Japan | 1-177169 |
| Jul. 18, 1989 | [JP] | Japan | 1-183718 |
| Jan. 23, 1990 | [JP] | Japan | 2-12003 |

[51] Int. Cl.[5] ........................ G01D 15/10; B41M 3/12

[52] U.S. Cl. ................................ 346/1.1; 346/76 PA; 428/206; 428/323; 428/913; 428/914

[58] Field of Search ................ 346/1.1, 76 PA, 135.1; 428/206, 323, 327, 484, 913, 914

[56] References Cited

U.S. PATENT DOCUMENTS

| | | | |
|---|---|---|---|
| 4,933,315 | 6/1990 | Kanto et al. | 428/913 X |
| 4,985,399 | 1/1991 | Matsuda et al. | 428/913 X |

OTHER PUBLICATIONS

"Introduction to Colloid and Surface Chemistry", D. Shaw, Liverpool College of Technology, GB, 1966.

*Primary Examiner*—Benjamin R. Fuller
*Assistant Examiner*—Gerald E. Preston
*Attorney, Agent, or Firm*—Oblon, Spivak, McClelland, Maier & Neustadt

[57] ABSTRACT

A thermosensitive recording method comprising the steps of superimposing a sublimation-type thermosensitive image transfer recording medium on an image receiving sheet, and applying heat imagewise to the recording medium while moving the recording medium and the image receiving sheet in such a manner that the running speed of the image receiving sheet is greater than that of the recording medium. The recording medium for use with the above method comprises an ink layer containing a sublimable dye and one or more organic binder agents in which the sublimable dye is dispersed in the form of granules.

18 Claims, 3 Drawing Sheets

THERMOSENSITIVE RECORDING METHOD USING SUBLIMATION-TYPE THERMOSENSITIVE IMAGE RECEIVING RECORDING MEDIUM

BACKGROUND OF THE INVENTION

1. Field of the Invention

This invention relates to a thermosensitive recording method using a sublimation-type thermosensitive image transfer recording medium.

2. Discussion of Background

Recently the demand for full color printers is increasing year by year. Typical recording methods for full color printers now available include the electrophotographic method, the ink-jet method, and the thermosensitive image transfer method. Of these methods, the thermosensitive image transfer method is most widely employed because of its advantages over the other methods in that maintenance is easy and operation is noiseless.

In the thermosensitive image transfer recording; method, a solidified color ink sheet and a receiving sheet are employed, and a color ink is transferred imagewise from the ink sheet to the receiving sheet due to the thermal fusion or the sublimation of the ink, under the application of thermal energy by laser beams or a thermal head which is controlled by electric signals.

Thus, the thermosensitive image transfer recording method can be roughly classified into two types, a thermal fusing image transfer type and a sublimation image transfer type. The sublimation image transfer type is advantageous over the thermal fusing type in that halftone can be obtained without difficulty and image gradation can be controlled as desired. These benefits exist because a sublimable dye is in principle sublimated in the form of independent molecules in such an amount as to correspond to the amount of thermal energy applied thereto, for instance, through a thermal head. Therefore, the sublimation image transfer type is considered the most suitable for color printers.

The sublimation image transfer recording method, however, has a shortcoming in that its running cost is high, because in this image transfer method, a yellow ink sheet, a magenta ink sheet, a cyan ink sheet and, if necessary, a black ink sheet, are employed in order to obtain a full-color image, with selective application of thermal energy to each ink sheet, and discarded after the recording, even though large unused portions remain on each ink sheet.

In order to eliminate this shortcoming, a multiple printing recording method has been proposed, in which an ink sheet is used repeatedly.

The multiple printing recording method includes an equal-speed mode method and an n-time-speed mode method. In the former method, an ink sheet and an image receiving sheet are moved at the same speed when images are recorded. In the latter method, on the other hand, the running speed of the image receiving sheet is made n ($n>1$) times the running speed of the ink sheet when images are printed, and the ink sheet is shifted little by little in such a manner that the first used portion and the second used portion are overlapped each other. It is therefore a matter of course that a larger value of "n" contributes to higher cost reduction.

Since a non-used portion of the ink sheet is provided together with a used portion when images are printed, the n-time-speed mode method can minimize the scatter of the amount of a residual ink. In the equal-speed mode method, on the other hand, a used portion of the ink sheet is merely used repeatedly. Therefore, the n-time-speed mode method is advantageous over the equal-speed mode method as reported in the Journal of the Institute of Electronics and Communication Engineers, Vol. J70-C, No. 11, pages 1537–1544 (1987).

In the sublimation-type thermosensitive image transfer recording method, the sublimation and evaporation reaction is basically a reaction of zero order. Therefore, even if the ink layer of the ink sheet is provided with a sufficient amount a dye for multiple printing, the ink sheet cannot be used for multiple printing even when the n-time-speed mode method is employed. The printed image density significantly decreases as the value of "n" increases, in other words, as the relative speed of the recording medium decreases, particularly in high image density areas.

SUMMARY OF THE INVENTION

Accordingly, it is an object of the present invention to provide a thermosensitive recording method which can eliminate the above shortcomings in the conventional n-time-speed mode method, and can maintain high printed image density even when the value of "n" increases.

The above object of the present invention can be attained by a thermosensitive recording method comprising a steps of (1) superimposing a sublimation-type thermosensitive image transfer recording medium on an image receiving sheet, which image transfer recording medium comprises a support and an ink layer formed thereon, comprising a sublimable dye and one or more organic binder agents in which the sublimable dye is dispersed in the form of granules, and (2) applying heat imagewise to the sublimation-type thermosensitive image transfer recording medium so as to transfer imagewise the sublimable dye from the image transfer recording medium to the image receiving sheet by a heat application means while moving the recording medium and the image receiving sheet in such a manner that the running speed of the image receiving sheet is greater than that of the image transfer recording medium.

BRIEF DESCRIPTION OF THE DRAWINGS

A more complete appreciation of the invention and many of the attendant advantages thereof will be readily obtained as the same becomes better understood by reference to the following detailed description when considered in connection wiht the accompanying drawings, wherein.

DETAILED DESCRIPTION OF THE PREFERRED EMBODIMENTS

Figure 1:
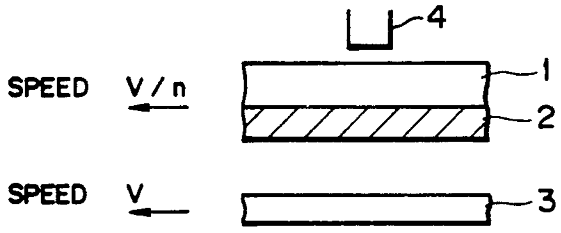
FIG. 1 is a schematic illustration of a sublimation-type thermosensitive image transfer recording medium for use in the thermosensitive recording method according to the present invention.

A sublimation-type thermosensitive image transfer recording medium for use in the recording method according to the present invention is as follows.

The recording medium is characterized by comprising an ink layer in which a sublimable dye is dispersed in an organic binder agent in the form of granules. It is preferable that the ink layer have a smooth surface and the organic binder agent be a thermoplastic resin.

The sublimable dye dispersed in the form of granules contributes to minimize the decrease of the printed image density in high image density areas, which decrease tends to occur when the number of printing times is increased. The ink layer with a smooth surface can improve the thermal sensitivity at a low energy-applied portion. In the case where a thermoplastic resin is employed as the organic binder agent, printed images with a smooth surface can be obtained even if the sublimable dye exists in the ink layer in the form of granules.

When images are printed by the conventional equal-speed mode method, the printed image density decreases with the increase of the number of printing times. The inventors of the present invention assumed that the gas barrier property of the binder agent contained in the ink layer causes the above decrease in the printed image density. In order to prevent such a decrease in the printed image density, the ink layer should be provided with the sublimable dye and the binder agent in amounts much larger than those provided in the ordinary ink layer for one-time use. As a result, the thickness of the ink layer is increased.

In the case where all or almost all of the sublimable dye is dissolved in the bider resin in the ink layer having an increased thickness, the dye contained in the lower part of the ink layer cannot diffuse to the upper part thereof in a short time due to the gas barrier property of the binder resin when images are printed under application of heat thereto. Therefore, the dye contained in the lower part of the ink layer cannot contribute to the printed image density. This means that the amount of the dye to be transferred to the image receiving sheet is determined only by the amount of the dye contained in the vicinity of the upper surface of the ink layer.

When images are printed, the dye contained in the vicinity of the upper surface of the ink layer transfers to an image receiving sheet, so that the dye concentration in the vicinity of the upper surface of the ink layer decreases. On the other hand, the dye contained in the lower part of the ink layer cannot diffuse to the upper surface due to the gas barrier property of the binder agent in which the dye is dispersed. As a result, the dye concentration at the lower part of the ink layer becomes higher than that at the upper part thereof. Thus, the dye concentration at the upper part of the ink layer decreases with the increase of the number of printing times, and the printed image density is drastically lowered in high image density areas when multiple printing is conducted even if the ink layer contains the sufficient amount of the dye.

The sublimation reaction of the dye is a reaction of zero order, but the printed image density changes as if it were a reaction of first order.

In order to prevent the decrease in the printed image density with the increase of the number of printing times, the inventors of the present invention have tried to mitigate the influence of the gas barrier property of the binder agent in the ink layer. As a result, it was found that multiple printing can be successfully achieved when the dye is dispersed in the binder agent in the form of granules.

Namely, the inventors have developed a sublimation-type thermosensitive image transfer recording medium comprising an ink layer in which a sublimable dye is dispersed in a binder agent in the form of granules as illustrated in FIG. 1. In this figure, reference numeral 1 designates a support, reference numeral 2 designates an ink layer, reference numeral 3 designates an image receiving layer and reference numeral 4 designates a thermal head.

Furthermore, in order to ensure the multiple printing, the above recording medium is used in combination with the recording method of the n-time-speed mode in which the image receiving sheet is moved at a running speed of n ($n>1$) times that of the ink sheet when images are printed.

In the case where the dye is dispersed in the binder agent in the form of finely-divided particles so that the ink layer can be brought into close contact with the image receiving sheet, the dye concentration at the upper part of the ink layer decreases when multiple printing is conducted. Therefore, very fine granular dye is not suitable for the purposes.

When the granular dye has a large size, the amount of the dye used for image printing at one time can be neglected, so that multiple printing can be successfully achieved. However, when the size of the granular dye is larger than the thickness of the ink layer, the surface of the ink layer becomes uneven. As a result, high quality images cannot be obtained. It is therefore preferable that the size of the granular dye be sufficiently large for multiple printing but smaller than the thickness of the ink layer. Practically, the size of the granular dye is 1.0 to 20 $\mu$m, preferably 1.0 to 10 $\mu$m.

Any disperse and oil-soluble dyes which can sublime or vaporize at a temperature of 60° C. or more and are ordinarily used in the field of thermal image transfer recording can be used in the ink layer of the recording medium for use with the thermosensitive recording method according to the present invention. Specific examples of such dyes include C.I. Disperse Yellows 1, 3, 8, 9, 16, 41, 54, 60, 77 and 116, C.I. Disperse Reds 1, 4, 6, 11, 15, 17, 55, 59, 60, 73 and 83, C.I. Disperse Blues 3, 14, 19, 26, 56, 60, 64, 72, 99 and 108, C.I. Solvent Yellows 77 and 116, C.I. Solvent Reds 23, 25 and 27, and C.I. Solvent Blues 36, 83 and 105. These dyes can be used either singly or in combination. The concentration of the dye contained in the ink layer is 5 to 80 wt%, preferably 10 to 60 wt%.

A thermoplastic resin is preferably employed as the binder agent in which the above sublimable dye is dispersed. It is preferable that the thermoplastic resin have a softening point in the range of 100° C. to 250° C. Specific examples of such resins include a thermoplastic elastomer, a polyvinylchloride resin, a polyvinylacetate resin, polyamide, polyethylene, polystyrene, an acrylic resin, a butylacetate resin, a natural rubber, a synthetic rubber, polyvinyl alcohol, celluloses, a fluorine-contained resin, a polyacetal resin, polycarbonate, polyester, a polysulfone resin, a polyvinylbutyral resin, a polyphenylene oxide resin and a polypropylene resin. In addition, urethane resins which contain only a small number of cross-linked moieties and have a softening point of 250° C. or less can be used as the binder agent. The above resins are used either singly or in combination. Even some resins which have a softening point of 100° C. or less can be used in combination with the above resins.

It is preferable to select the combination of the binder agent and the sublimable dye so that the dye cannot be dissolved in the binder agent.

Furthermore, thermosetting resins can also be used as the binder agent. Examples of such thermosetting resins include an epoxy resin, a melamine resin, a phenol resin and a polyurethane resin. Of these, a polyurethane resin containing polyol and diisocyanate moieties is preferable when compatibility with the granular dye and adhesion to the support are taken into consideration.

A sheet of condenser paper, a polyester film, a polystyrene film, a polysulfone film, a polyimide film, a polyamide film, a polycarbonate film or a triacetyl cellulose film can be employed as the support of the recording medium of the present invention. Of these, a polyester film and an aromatic polyamide film are preferred.

Commercially available polyester resins which can be used for the material of the support are as follows: "Vylon 200", "Vylon 300", "Vylon 220", "Vylon 280", "Vylon 290" and "Vylon 600" (Trademarks, all available from Toyobo Co., Ltd.); and "UE-3200", "UE-3201", "UE-3210", "UE-3203", "UE-3600", "UE-3220", "UE-3221", "UE-3230", "UE-3400" and "UE-3500" (Trademarks, all available from Unitika Ltd.).

Commercially available aromatic polyamide resins usable as the material for the support in the present invention are as follows: "Barsamide 711", "Barsamide 725", "Barsamide 750", "Barsamide 754", "Barsamide 930", "Barsamide 940" and "Barsamide 1635" (Trademarks, all available from Henkel Japan, Ltd.)

An adhesive layer may be interposed between the support and the ink layer, if necessary. Furthermore, a heat-resistant releasing layer may be formed on the reverse surface (opposite to the ink layer) of the support, if necessary.

The thickness of the ink layer is 1 to 20 μm, preferably 1 to 8 μm.

In order to prevent the ink layer from peeling off the support, which is caused by the friction between the ink sheet and the image receiving sheet, and to prevent these two sheets from sticking together by fusing, it is preferable that the following modifications be employed:

(1) The ink layer further comprises a lubricant or a releasant.

(2) The support comprises a resin, and at least one of the organic binder agents in the ink layer is of the same type as the resin contained in the support.

(3) At least one of the organic binder agents in the ink layer comprises a reaction product between an isocyanate compound and a compound having an active hydrogen.

(4) An intermediate layer comprising an organic resin is interposed between the support and the ink layer.

(5) The organic resin contained in the above intermediate layer comprises a reaction product between an isocyanate compound and a compound having an active hydrogen.

(6) The organic resin contained in the above intermediate layer and at least one of the organic binder agents in the ink layer are the same or of the same kind.

(7) The recording medium comprising the ink layer described in the above (1) comprises an additional ink layer between the support and the ink layer. The additional ink layer comprises a sublimable dye dispersed in the form of granules in a binder agent containing a reaction product between an isocyanate compound and a compound having an active hydrogen.

Examples of the lubricant and the releasant for use in the ink layer include petroleum lubricant oils such as liquid paraffin, synthetic lubricant oils such as halogenated hydrogen, diester oil, silicone oil and fluorine-contained silicone oil, modified silicone oils such as epoxy-modified silicone oil, amine-modified silicone oil, alkyl-modified silicone oil, polyether-modified silicone oil, silicone-contained lubricants such as a copolymer of an organic compound, for example, polyoxyalkylene glycol and silicone, fluorine-contained surface active agents such as a fluoroalkyl compound, fluorine-contained lubricants such as trifluorinated ethylene chloride polymer having a low molecular weight, waxes such as paraffin wax and polyethylene wax, higher fatty acids, higher fatty alcohols, higher fatty amides, higher fatty esters, and salts of higher fatty acid.

The amount of the lubricant or the releasant incorporated into the ink layer is preferably 5 to 30 wt% of the total weight of the ink layer. As far as the amount of the lubricant or the releasant falls within the above range, fusing between the ink layer and the image receiving layer can be prevented, and the ink layer can have high sensitivity and high preservability.

As mentioned previously, it is preferable that at least one of the binder agents used in the ink layer and the resin contained in the support be the same or of the same type. The amount of such a resin varies depending on the type, and generally, 10 parts by weight of the resin is used per 100 parts by weight of the total binder resin used in the ink layer aiming at improving the adhesion between the support and the ink layer.

The compound having an active hydrogen is reacted with the isocyanate compound to form an urethane compound. Examples of such a compound include polyvinyl butyral, polyvinyl acetal, polyurethane polyol, polyether polyol, polyester polyol, polyacrylate, an acryl - polyester copolymer, an alkyd resin, silicone polyester, an epoxy resin having an epoxy group opened by an alkanol amine. Examples of the isocyanate compound include di-isocyanate and tri-isocyanate. Specific examples of these isocyanates include 2,4-tolylene diisocyanate, 2,6-tolylene diisocyanate, 4,4'-diphenylmethane diisocyanate, hexamethylene diisocyanate, xylene diisocyanate, triphenylmethane triisocyanate, isophorone diisocyanate, bisisocyanate methyl cyclohexane, and trimethylhexamethylene diisocyanate.

Of these, polyvinyl butyral is preferred when the compatibility with the dye, barrier property, and preservability of the ink sheet are taken into consideration.

From the handling point of view, commercially available isocyanates "Coronate L" (Trademark, a product of Nippon Polyurethane Industry Co., Ltd.) and "Takenate D" (Trademark, a product of Takeda Chemical Industries, Ltd.) are preferably employed.

It is preferable to blend the isocyanate compound and the compound having an active hydrogen in such an amount that the ratio of —NCO groups contained in the isocyanate compound to —OH groups contained in the compound having an active hydrogen is in the range of from 0.1 : 1 to 1 : 1.

In order to prevent exfoliation of the ink layer from the support, an intermediate layer may be interposed between the support and the ink layer.

As a material of the intermediate layer, a thermoplastic elastomer, or a thermoplastic resin such as a fluorine-contained resin, a polyacetal resin, polycarbonate, saturated polyester, a polysulfone resin, a polyvinyl butyral resin, a polyphenyleneoxide resin or a polypropylene resin can be employed. However, the most preferable material is a thermosetting resin. When the thermosetting resin is used, the ink layer and the intermediate layer are not easily broken even when high frictional force is applied thereto, and the ink layer is not thermally transferred to an image receiving sheet. Examples of the thermosetting resin include an epoxy resin, a melamine resin, a phenol resin and a polyurethane resin.

An intermediate layer containing the above-described reaction product between an isocyanate compound and a compound having an active hydrogen is particulary effective.

It is preferable that the organic resin for the intermediate layer and at least one of the organic binder agents in the ink layer be the same or of the same kind when the adhesion between the ink layer and the intermediate layer is taken into consideration. Such a material is a single resin or a mixture of some resins selected from the above-enumerated resins.

Furthermore, when the intermediate layer and the ink layer comprise the same resin or the same kind of resin, for example, the above-described reaction product between an isocyanate compound and a compound having an active hydrogen, the adhesion between these two layers can be improved and exfoliation of the ink layer from the support can be prevented.

In the case where the recording medium comprises an additional ink layer between the support and the ink layer, the thickness of each ink layer is 0.5 to 10 μm, preferably 1 to 5 μm.

As mentioned previously, it is preferable that the surface of the ink layer be smooth as possible. The smooth surface can be obtained by one of the following methods.

(i) The method in which the size of the granular dye contained in the ink layer is properly controlled.

(ii) The method in which an ink once coated onto the smooth surface is transferred to a support to form an ink layer.

(iii) The method in which a substance with a smooth surface is overlaid on an ink layer formed on a support when the ink layer is dried.

(iv) The method in which a substance with a smooth surface is overlaid on an ink layer formed on a support after the ink layer is dried, and the resulting ink layer on the support is heated to a temperature higher than the softening point of the binder agent contained in the ink layer.

(v) The method in which an ink layer, which has been formed on a support and then dried, is subjected to calendering.

In the present invention, thermal image transfer may be carried out by using a thermal head, by laser beams using a support which absorbs laser beams and generates heat therefrom, or by causing an electric current to flow through the support and/or an ink-containing layer formed thereon so as to generate Joule's heat therein, that is, by the so-called electrothermic non-impact printing. The electrothermic non-impact printing method is described in many references, such as U.S. Pat. No. 4,103,066, and Japanese Laid-Open Patent Applications 57-14060, 57-11080 and 59-9096.

When the electrothermic non-impact printing method is employed, the following materials are used for the support of the thermosensitive image transfer recording medium for use with the thermosensitive recording method according to the present invention: materials which are modified to have an intermediate electric resistivity between the electric resistivities of an electroconductive material and an insulating material, for example, by dispersing finely-divided electroconductive particles, such as finely-divided metal particles of aluminum, copper, iron, tin, zinc, nickel, molybudenum and silver, and/or carbon black, in a resin having relatively high heat resistance, such as polyester, polycarbonate, triacetyl cellulose, nylon, polyimide and aromatic polyimides, or by using a support of the above-mentioned resins, with the above-mentioned electroconductive metals deposited thereon by vacuum deposition or sputtering.

It is preferable that the thickness of the above support be in the range of approximately 2 to 15 μm when the thermal conductivity thereof for the generated Joule's heat is taken into consideration.

When laser beams are employed for image transfer, it is preferable that the support absorb laser beams and generate heat. For this purpose, for example, a support comprising a conventional thermal transfer film with addition thereto a material which absorbs heat and converts the light into heat, such as carbon black, may be employed. Alternatively, a light-absorbing and heat-generating layer may be laminated on the obverse and/or reverse surface of the support.

Other features of this invention will become apparent in the course of the following description of exemplary embodiments, which are given for illustration of the invention and are not limiting thereof.

EXAMPLE A-1

The following components were placed in a ball mill pot, and dispersed to obtain an ink composition.

| [Formulation of Ink Composition] | | Parts by Weight |
|---|---|---|
| Binder: | Polyurethane resin "SF Primer 725" (Trademark, a product of Dainippon Ink & Chemicals, Incorporated) | 10 |
| Hardening agent: | "CVL Hardner No. 10" | 0.8 |
| Sublimable dye: | "KAYASET RED B" (Trademark, a product of Nippon Kayaku Co., Ltd.) | 10 |
| Solvents: | Toluene | 20 |
| | Ethylacetate | 20 |
| | Isopropyl alcohol | 10 |

The above-obtained ink composition was coated onto a polyimide film (made by Du Pont-Toray Co., Ltd.) with a thickness of 7.5 μm, which serves as a support, by a wire bar, and then dried, thereby forming an ink layer having a thickness of approximately 6.0 μm containing 4 $g/m^2$ of the sublimable dye. The resulting polyimide film on which the ink layer was formed was preserved in a thermostatic chamber at a temperature of 50° C. for approximately 48 hours to cure the ink layer, whereby sublimation-type thermosensitive image transfer recording medium No. A-1 according to the present invention was prepared.

The surface gloss of the ink layer of the above-obtained recording medium was measured by a "Gloss Meter VGS-10" (made by Nippon Denshoku Kogyo K.K.) in accordance with JIS Z-8741. As a result, the ink layer was found to have a rough surface with a surface gloss Gs (at 60° C.) of 1.5%.

Furthermore, the ink layer was observed by a scan-type electron microscope S-310A (made by Hitachi, Ltd.). It was found in the 2000-time magnified sample that the dye granules having a mean diameter of 5 μm were homogeneously dispersed in the binder resin.

EXAMPLE A-2

A polyimide film with a thickness of 7.5 μm (made by Du Pont-Toray Co., Ltd.) was superimposed on the ink layer of the recording medium No. A-1, and solid printing was conducted by applying an energy of 2.21 mJ/dot thereto. Thereafter, the recording medium was subjected to a heat treatment at 100° C. for 10 minutes to smoothening the surface of the ink layer, whereby sublimation-type thermosensitive image transfer recording medium No. A-2 according to the present invention was prepared.

The surface gloss of the ink layer of the above-obtained recording medium was measured by the same method as in Example A-1. As a result, the ink layer was found to have a smooth surface with a surface gloss Gs (at 60° C.) of 55.8%.

Furthermore, the ink layer was observed by a scan-type electron microscope S-310A (made by Hitachi, Ltd.). It was found in the 2000-time magnified sample that the dye granules having a mean diameter of 5 μm were homogeneously dispersed in the binder resin.

EXAMPLE A-3

The procedure of Example A-2 was repeated except that the polyimide film used in Example A-2 was replaced ) by an image receiving sheet (Trademark "Supply VY-S100" for "Hitachi Video Printer VY-50"), whereby sublimation-type thermosensitive image transfer recording medium No. A-3 according to the present invention was prepared.

The surface gloss of the ink layer of the above-obtained recording medium was measured by the same method as in Example A-1. As a result, the ink layer was found to have a smooth surface with a surface gloss Gs (at 60° C.) of 20.3%.

Furthermore, the ink layer was observed by a scan-type electron microscope S-310A (made by Hitachi, Ltd.). It was found in the 2000-time magnified sample that the dye granules having a mean diameter of 5 μm were homogeneously dispersed in the binder resin.

EXAMPLE A-4

The following components were placed in a ball mill pot, and dispersed for 24 hours to obtain an ink composition.

| [Formulation of Ink Composition] | | Parts by Weight |
|---|---|---|
| Binder: | Polyvinyl butyral resin "BX-1" (Trademark, a product of Sekisui Chemical Co., Ltd.) | 10 |
| Hardening agent: | Isocyanate "Coronate L" (Trademark, a product of Nippon Polyurethane Industry Co., Ltd.) | 2 |
| Sublimable dye: | "KAYASET BLUE 714" (Trademark, a product of Nippon Kayaku Co., Ltd.) | 10 |
| Solvents: | Ethyl alcohol | 90 |
| | Butyl alcohol | 90 |
| | Isopropyl alcohol | 10 |

The above-obtained ink composition was coated onto a polyimide film (made by Du Pont-Toray Co., Ltd.) with a thickness of 8.5 μm, which serves as a support, by a wire bar, and then dried, thereby forming an ink layer having a thickness of approximately 5.5 μm containing 3.8 $g/m^2$ of the sublimable dye. The polyimide film on which the ink layer was formed was preserved in a thermostatic chamber at a temperature of 50° C. for approximately 48 hours to cure the ink layer, whereby sublimation-type thermosensitive image transfer recording medium No. A-4 according to the present invention was prepared.

The surface gloss of the ink layer of the above-obtained recording medium was measured by the same method as in Example A-1. As a result, the ink layer was found to have a rough surface with a surface gloss Gs (at 60° C.) of 10.4%.

Furthermore, the ink layer was observed by a scan-type electron microscope S-310A (made by Hitachi, Ltd.). It was found in the 2000-time magnified sample that the dye granules having a mean diameter of 5 μm were homogeneously dispersed in the binder resin.

The above-prepared sublimation-type thermosensitive image transfer recording media Nos. A-1 through A-4 according to the present invention were subjected to a thermal recording test, using a thermal head of a 6 dot/mm -partial grace type and an image receiving sheet, "Supply VY-S100" for "Hitachi Video Printer VY-50". In this recording test, the applied power was 442 mW/dot, and the ratio "n" of the running speed of the image receiving sheet to that of the recording medium was changed from 1 to 15. The printed image density was measured by a Macbeth Densitometer RD-514. The results are shown in FIG. 2.

Figure 2:
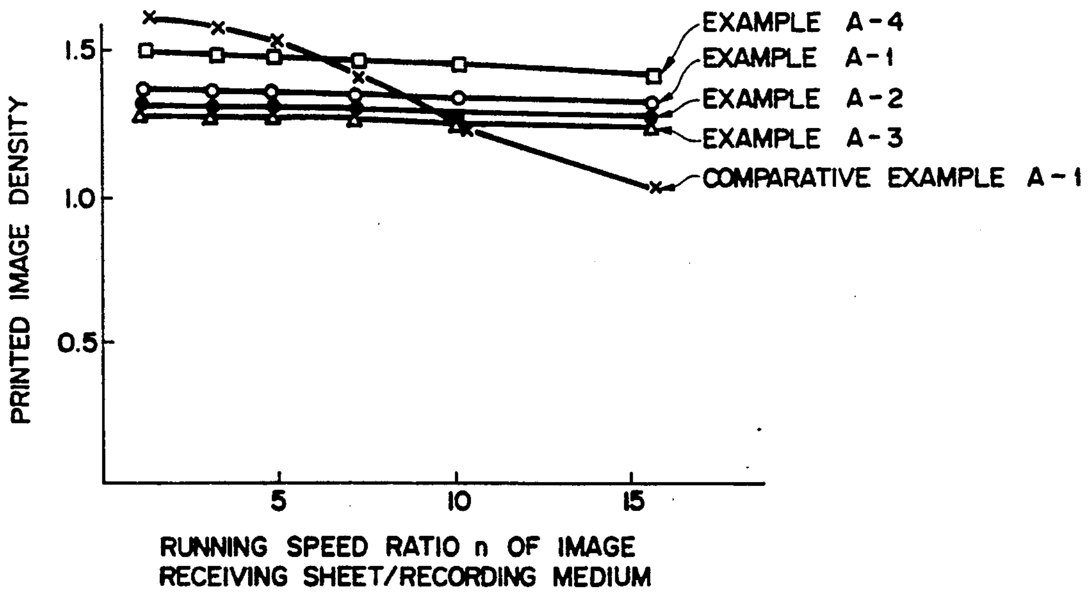
FIG. 2 is a graph showing the relationship between the ratio "n" of the running speed of an image receiving sheet to that of a sublimation-type thermosensitive image transfer recording medium and the printed image density respectively obtained in Examples A-1, A-2, A-3 and A-4, and Comparative Example A-1.

The printed image density was unchanged even when the running speed ratio "n" was increased to 15 as shown in the graph of FIG. 2.

The ink layers of the recording media Nos. A-2 and A-3 according to the present invention were subjected to a smoothening treatment, so that the surfaces of these recording media are more smoother than those of the recording media Nos. A-1 and A-4. Therefore, images obtained from the recording media Nos. A-2 and A-3 had higher quality with a higher gloss and uniformity, and showed lower decrease in the printed image density than those obtained from the recording media Nos. A-1 and A-4.

COMPARATIVE EXAMPLE A-1

An ink composition having the following formulation was coated onto a polyimide film (made of Du Pont-Tray Co., Ltd.) with a thickness of 7.5 μm by a wire bar, and then dried, whereby comparative sublimation-type thermosensitive image transfer recording medium No. A-1 was prepared, which had an ink layer with a thickness of 6.0 μm.

| [Formulation of Ink Composition] | | Parts by Weight |
|---|---|---|
| Binder: | Polyvinyl butyral resin "BX-1" (Trademark, a product of Sekisui Chemical Co., Ltd.) | 10 |
| Hardening agent: | Isocyanate "Coronate L" (Trademark, a product of Nippon Polyurethane Industry Co., Ltd.) | 2 |
| Sublimable dye: | "KAYASET BLUE 714" (Trademark, a product of Nippon Kayaku Co., Ltd.) | 10 |
| Solvents: | Toluene | 100 |
| | Methyl ethyl ketone | 100 |

The surface of the above-obtained recording medium was observed by a scan-type electron microscope S-310A, and found that the sublimable dye was completely dissolved and no granules of the dye existed in the ink layer.

The recording medium was subjected to the same printing test as in Example A-1. The results are shown in FIG. 2.

The graph in FIG. 2 shows that the printed image density begins to decrease at a running speed ratio "n" of approximately 5, and remarkably decreases when the running speed ratio increases further.

COMPARATIVE EXAMPLE A-2

The sublimation-type thermosensitive image transfer recording medium No. A-2 according to the present invention was subjected to the multiple printing by the equal-speed mode method (running speed ratio n=1).

Figure 3:
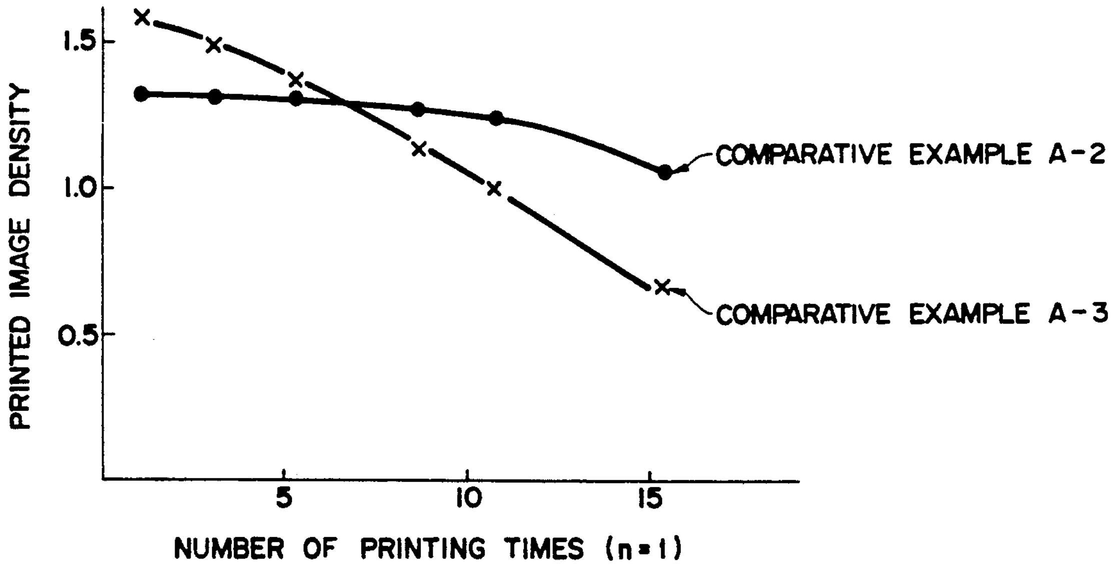
FIG. 3 is a graph showing the relationship between the number of printing times and the printed image density when the above-described running speed ratio "n" is 1, obtained in Comparative Examples A-2 and A-3.

The results are shown in FIG. 3. The printed image density began to decrease at 8th printing.

COMPARATIVE EXAMPLE A-3

The sublimation-type thermosensitive image transfer recording medium No. A-1 according to the present invention was subjected to the multiple printing by the equal-speed mode method (running speed ratio n=1).

The results are shown in FIG. 3. The printed image density began to decrease at 2nd printing.

EXAMPLE B-1

An ink composition having the following formulation was coated onto an aromatic polyamide film with a thickness of 6 μm which was backed with a silicone heat-resistant layer with a thickness of 1 μm, whereby sublimation-type thermosensitive image transfer recording medium No. B-1 according to the present invention was prepared, which had an ink layer containing 3.8 g/m$^2$ of the sublimation dye.

| [Formulation of Ink Composition] | Parts by Weight |
|---|---|
| Polyvinyl butyral resin "BX-L" (Trademark, a product of Sekisui Chemical Co., Ltd. | 7 |
| Polyamide resin "Tomide 410N" (Trademark, a product of Fuji Kasei Co., Ltd.) | 3 |
| Sublimable dye "KAYASET BLUE 714" (Trademark, a product of Nippon Kayaku Co., Ltd.) | 20 |
| Releasant "Montan Wax BJ" (Trademark, a product of Hoechst Japan Limited) | 3 |
| Ethanol | 20 |
| Methyl ethyl ketone | 40 |
| Toluene | 40 |

The above-formed ink layer was observed by a scan-type electron microscope S-310A (made by Hitachi, Ltd.). It was found in the 2000-time magnified sample that the dye granules having a mean diameter of 5 μm were homogeneously dispersed in the binder resin.

EXAMPLE B-2

The procedure of Example B-1 was repeated except that the polyamide resin used in Example B-1 was replaced by "Tomide 225X" (Trademark, a product of Fuji Kasei Cc., Ltd.), whereby sublimation-type thermosensitive image transfer recording medium No. B-2 according to the present invention was prepared.

The above-formed ink layer was observed by a scan-type electron microscope S-310A (made by Hitachi, Ltd.). It was found in the 2000-time magnified sample that the dye granules were homogeneously dispersed in the binder resin.

EXAMPLE B-3

The procedure of Example B-1 was repeated except that the ink composition used in Example B-1 was replaced by an ink composition having the following formulation, and the ink layer was cured at 60° C. for 48 hours, whereby sublimation-type thermosensitive image transfer recording medium No. B-3 according to the present invenion was prepared

| [Formulation of Ink Composition] | Parts by Weight |
|---|---|
| Polyvinyl butyral resin "BX-1" (Trademark, a product of Sekisui Chemical Co., Ltd.) | 8 |
| Polyamide resin "N-153-1M-65" (Trademark, a product of Dainippon Ink & Chemicals, Incorporated) | 2 |
| Sublimable dye "KAYASET BLUE 714" (Trademark, a product of Nippon Kayaku Co., Ltd.) | 20 |
| Releasant "Carnauba Wax No. 1" (Trademark, a product of Noda Wax Co., Ltd.) | 3 |
| Diisocyanate "Coronate L" (Trademark, a product of Nippon Polyurethane Industry Co., Ltd.) | 2 |
| Xylene | 100 |
| n-Butanol | 100 |

The above-formed ink layer was observed by a scan-type electron microscope S-310A (made by Hitachi, Ltd.). It was found in the 2000-time magnified sample that the dye granules were homogeneously dispersed in the binder resin.

EXAMPLE B-4

The procedure of Example B-1 was repeated except that the ink composition used in Example B-1 was replaced by an ink composition having the following formulation, and the aromatic polyamide film used as the support was replaced by a polyethylene terephthalate film with a thickness cf 9 μm, backed with a silicone resin heat-resistant layer with a thickness of 1 μm, whereby sublimation-type thermosensitive image transfer recording medium No. B-4 according to the present invention was prepared.

| [Formulation of Ink Composition] | Parts by Weight |
|---|---|
| Cellulose acetate butyral resin "CAB 381-0.5" (Trademark, a product Eastman Kodak Co., Ltd.) | 5 |
| Polyester resin "UE-3220" (Trademark, a product of Unitika Ltd. | 5 |
| Releasant "Montan Wax BJ" (Trademark, a product of Hoechst Japan Ltd.) | 3 |
| Sublimable dye "KAYASET BLUE 714" (Trademark, a product of Nippon Kayaku Co., Ltd.) | 20 |
| Diisocyanate "Coronate L" (Trademark, a product of Nippon Polyurethane Industry Co., Ltd.) | 2 |
| Toluene | 50 |
| Methyl ethyl ketone | 50 |

The above-formed ink layer was observed by a scan-type electron microscope S-310A (made by Hitachi, Ltd.). It was found in the 2000-time magnified sample that the dye granules were homogeneously dispersed in the binder resin.

COMPARATIVE EXAMPLE B-1

The procedure of Example B-1 was repeated except that the polyamide resin used in Example B-1 was replaced by polyvinyl butyral "BX-L" (Trademark), whereby comparative sublimation-type thermosensitive image transfer recording medium No. B-1 was prepared.

The above-formed ink layer was observed by a scan-type electron microscope S-310A (made by Hitachi, Ltd.). It was found in the 2000-time magnified sample that the dye granules were homogeneously dispersed in the binder resin.

COMPARATIVE EXAMPLE B-2

The procedure of Example B-3 was repeated except that the polyamide resin used in Example B-3 was replaced by polyvinyl butyral "BX-1" (Trademark), whereby comparative sublimation-type thermosensitive image transfer recording medium No. B-2 was prepared.

The above-formed ink layer was observed by a scan-type electron microscope S-310A (made by Hitachi, Ltd.). It was found in the 2000-time magnified sample that the dye granules were homogeneously dispersed in the binder resin.

COMPARATIVE EXAMPLE B-3

The procedure of Example B-4 was repeated except that the polyester resin used in Example B-4 was replaced by cellulose acetate butyral CAB 381-0.5 (Trademark), whereby comparative sublimation-type thermosensitive image transfer recording medium No. B-3 was prepared.

The above-formed ink layer was observed by a scan-type electron microscope S-310A {made by Hitachi, Ltd.). It was found in the 2000-time magnified sample that the dye granules were homogeneously dispersed in the binder resin.

The above-prepared sublimation type thermosensitive image transfer recording media Nos. B-1 through B-4 according to the present invention and comparative recording media Nos. B-1 through B-3 were subjected to a thermal recording test using a thermal head of a 6 dot/mm - partial grace type and an image receiving sheet prepared by the following method:

A liquid for forming an image receiving layer having the following formulation was coated onto a synthetic paper with a thickness of 150 μm (a product of Oji-Yuka Synthetic Paper Co., Ltd.) by a wire bar to form an image receiving with a thickness of 8 μm, and then cured at 60° C. for 48 hours to form an image receiving layer, whereby an image receiving sheet was prepared.

| [Formulation of Liquid for Forming Image Receiving Layer] | Parts by Weight |
|---|---|
| Linear Saturated Polyester "Vylon 200" (Trademark, a product of Toyobo Co., Ltd.) | 20 |
| Isocyanate "Coronate L" (Trademark, a product of Nippon Polyurethane Industry Co., Ltd.) | 2 |
| Amino-modified silicone oil "KF-393" (Trademark, a product of Shin-Etsu Chemical Co., Ltd.) | 1 |
| Epoxy-modified silicone oil "X-22-343" (Trademark, a product of Shin-Etsu Chemical Co., Ltd.) | 1 |
| Toluene | 38 |
| Methyl ethyl ketone | 38 |

In this recording test, the applied power was 442 mW/dot, and the ratio "n" of the running speed of the image receiving sheet to that of the recording medium was changed from 1 to 15. The printed image density was measured by a Macbeth Densitometer RD-514.

As a result, it was found that the density of printed images obtained from each recording medium was unchanged from the out set to 15th printing. However, with respect to thermal transfer of the ink layer to the image receiving sheet, the following results were obtained.

| Recording Medium | Thermal Transfer of Ink Layer |
|---|---|
| No. B-1 | The ink layer slightly transferred to the image receiving sheet. |
| No. B-2 | The ink layer slightly transferred to the image receiving sheet. |
| No. B-3 | The ink layer did not transfer to the image receiving sheet. |
| No. B-4 | The ink layer did not transfer to the image receiving sheet. |
| Comp. No. B-1 | The ink layer transferred to the image receiving sheet. |
| Comp. No. B-2 | The ink layer transferred to the image receiving sheet. |
| Comp. No. B-3 | The ink layer transferred to the image receiving sheet. |

EXAMPLE C-1

A liquid for forming an intermediate layer having the following formulation was coated onto an aromatic polyamide film (a product of Toray Industries, Inc.) with a thickness of 6 μm, backed with a heat-resistant releasing layer, to form an intermediate layer with a thickness of 1.0 μm.

| [Formulation of Liquid for Forming Intermediate Layer] | | Parts by Weight |
|---|---|---|
| Binder agent: | Polyvinyl butyral resin "BX-1" (Trademark, a product of Sekisui Chemical | 10 |

-continued

| [Formulation of Liquid for Forming Intermediate Layer] | | Parts by Weight |
|---|---|---|
| | Co., Ltd.) | |
| Hardening agent: | Diisocyanate "Coronate L" (Trademark, a product of Nippon Polyurethane Industry Co., Ltd.) | 2 |

The following components were placed in a ball mill pot and dispersed for 24 hours to obtain an ink composition. The resulting ink composition was coated onto the above-formed intermediate layer by a wire bar to form an ink layer containing 3.8 $g/m^2$ of the dye component. Thereafter the intermediate layer and the ink layer were cured at 50° C. for 48 hours, whereby sublimation-type thermosensitive image transfer recording medium No. C-1 according to the present invention was prepared.

| [Formulation of Ink Composition] | | Parts by Weight |
|---|---|---|
| Releasant: | Mycrocrystalline wax (a product of Nippon Seiro Co., Ltd.) | 4 |
| Binder agent: | Polyvinyl butyral resin "BX-1" (Trademark, a product of Sekisui Chemical Co., Ltd.) | 10 |
| Hardening agent: | Diisocyanate "Coronate L" (Trademark, a product of Nippon Polyurethane Industry Co., Ltd.) | 2 |
| Sublimable dye: | "KAYASET BLUE 714" (Trademark, a product of Nippon Kayaku Co., Ltd.) | 15 |
| Solvents: | Toluene | 95 |
| | Methyl ethyl ketone | 95 |

The above-formed ink layer was observed by a scan-type electron microscope S-310A (made by Hitachi, Ltd.). It was found in the 2000-time magnified sample that the dye granules having a mean diameter of 5 μm were homogeneously dispersed in the binder resin.

COMPARATIVE EXAMPLE C-1

The procedure of Example C-1 was repeated except that the intermediate layer formed in Example C-1 was eliminated, whereby comparative sublimation-type thermosensitive image transfer recording medium No. C-1 was prepared.

The above-formed ink layer was observed by a scan-type electron microscope S-310A (made by Hitachi, Ltd.). It was found in the 2000-time magnified sample that the dye granules were homogeneously dispersed in the binder resin.

EXAMPLE C-2

The procedure of Example C-1 was repeated except that the liquid for forming the intermediate layer and the ink composition used in Example C-1 were replaced by a liquid for forming an intermediate layer and an ink composition having the following formulations respectively, whereby sublimation-type thermosensitive image transfer recording medium No. C-2 was prepared.

| | | Parts by Weight |
|---|---|---|
| [Formulation of Liquid for Forming Intermediate Layer] | | |
| Binder agent: | Polyurethane resin "SF Primer 725" (Trademark, a product of Dainippon Ink & Chemicals, Incorporated) | 10 |
| Hardening agent: | "CVL Hardner No. 10" | 0.8 |
| [Formulation of Ink Composition] | | |
| Releasant: | "Montan Wax BJ" (Trademark, a product of Hoechst Japan, Ltd.) | 4 |
| Binder agent: | Polyurethane resin "SF Primer 725" (Trademark, a product of Dainippon Ink & Chemicals, Incorporated) | 10 |
| Hardening agent: | "CVL Hardner No. 10" | 0.8 |
| Sublimable dye: | "KAYASET BLUE 714" (Trademark, a product of Nippon Kayaku Co., Ltd.) | 15 |
| Solvents: | Toluene | 20 |
| | Ethylacetate | 20 |
| | Isopropyl alcohol | 10 |

The above-formed ink layer was observed by a scan-type electron microscope S-310A (made by Hitachi, Ltd.). It was found in the 2000-time magnified sample that the dye granules were homogeneously dispersed in the binder resin.

COMPARATIVE EXAMPLE C-2

The procedure of Example C-2 was repeated except that the intermediate layer formed in Example C-2 was eliminated, whereby comparative sublimation-type thermosensitive image transfer recording medium No. C-2 was prepared.

The above-formed ink layer was observed by a scan-type electron microscope S-310A (made by Hitachi, Ltd.). It was found in the 2000-time magnified sample that the dye granules were homogeneously dispersed in the binder resin.

EXAMPLE C-3

The procedure of Example C-1 was repeated except that the liquid for forming the intermediate layer and the ink composition used in Example C-1 were replaced by a liquid for forming an intermediate layer and an ink composition having the following formulations respectively, whereby sublimation-type thermosensitive image transfer recording medium No. C-3 was prepared.

| | | Parts by Weight |
|---|---|---|
| [Formulation of Liquid for Forming Intermediate Layer] | | |
| Binder agent: | Polyvinyl butyral resin "#6000-C" (Trademark, a product of Denki Kagaku Kogyo K.K.) | 10 |
| Hardening agent: | Diisocyanate "Takenate D-110N" (Trademark, a product of Takeda Chemical Industries, Ltd.) | 2 |
| [Formulation of Ink Composition] | | |
| Releasant: | "Carnauba Wax No. 1" (Trademark, a product of Noda Wax Co., Ltd.) | 4 |
| Binder agent: | Polyvinyl butyral resin "#6000-C" (Trademark, a product of Denki Kagaku Kogyp K.K.) | 10 |

-continued

| | | Parts by Weight |
|---|---|---|
| Hardening agent: | Diisocyanate "Takenate D-110N" (Trademark, a product of Takeda Chemical Industries, Ltd.) | 2 |
| Sublimable dye: | "KAYASET BLUE 714" (Trademark, a product of Nippon Kayaku Co., Ltd.) | 15 |
| Solvents: | Toluene | 95 |
| | Methyl ethyl ketone | 95 |

The above-formed ink layer was observed by a scan-type electron microscope S-310A (made by Hitachi, Ltd.). It was found in the 2000-time magnified sample that the dye granules were homogeneously dispersed in the binder resin.

COMPARATIVE EXAMPLE C-3

The procedure of Example C-3 was repeated except that the intermediate layer formed in Example C-3 was eliminated, whereby comparative sublimation-type thermosensitive image transfer recording medium No. C-3 was prepared.

The above-formed ink layer was observed by a scan-type electron microscope S-310A (made by Hitachi, Ltd.). It was found in the 2000-time magnified sample that the dye granules were homogeneously dispersed in the binder resin.

The above-prepared sublimation type thermosensitive image transfer recording media Nos. C-1 through C-3 according to the present invention and comparative recording media Nos. C-1 through C-3 were subjected to a thermal recording test using a thermal head of a 6 dot/mm - partial grace type and an image receiving sheet prepared by the following method:

A liquid for forming an image receiving layer having the following formulation was coated onto a synthetic paper with a thickness of 150 μm (a product of Oji-Yuka Synthetic Paper Co., Ltd.) by a wire bar to form an image receiving layer with a thickness of 8 μm, and then cured at 60° C. for 48 hours, whereby an image receiving sheet was prepared.

| [Formulation of Liquid for Forming Image Receiving Layer] | Parts by Weight |
|---|---|
| Linear Saturated Polyester "Vylon 200" (Trademark, a product of Toyobo Co., Ltd.) | 20 |
| Isocyanate "Coronate L" (Trademark, a product of Nippon Polyurethane Industry Co., Ltd.) | 2 |
| Amino-modified silicone oil "KF-393" (Trademark, a product of Shin-Etsu Chemical Co., Ltd.) | 1 |
| Epoxy-modified silicone oil "X-22-343" (Trademark, a product of Shin-Etsu Chemical Co., Ltd.) | 1 |
| Toluene | 38 |
| Methyl ethyl ketone | 38 |

In this recording test, the applied power was 442 mW/dot, the thermal energy applied from the thermal head was 3.54 mJ/dot, and the ratio "n" of the running speed of the image receiving sheet to that of the recording medium was changed from 1 to 15. The printed image density was measured by a Macbeth Densitometer RD-514.

As a result, it was found that the density of printed images obtained from each recording medium was unchanged even when the running speed ratio "n" was increased to 15. However, with respect to thermal transfer of the ink layer to the image receiving sheet, the following results were obtained.

| Recording Medium | Thermal Transfer of Ink Layer |
|---|---|
| No. C-1 | The ink layer did not transfer to the image receiving sheet. |
| No. C-2 | The ink layer did not transfer to the image receiving sheet. |
| No. C-3 | The ink layer did not transfer to the image receiving sheet. |
| Comp. No. C-1 | The ink layer slightly transferred to the image receiving sheet. |
| Comp. No. C-2 | The ink layer transferred to the image receiving sheet. |
| Comp. No. C-3 | The ink layer slightly transferred to the image receiving sheet. |

EXAMPLE D-1

Figure 4:
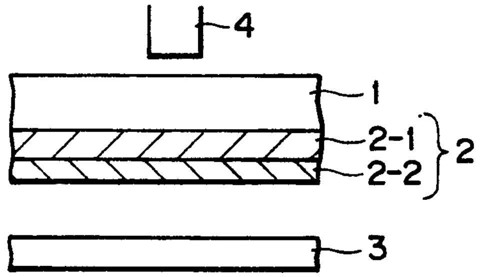
FIG. 4 is a schematic illustration of another sublimation-type thermosensitive image transfer recording medium for use in the thermosensitive recording method according to the present invention.

The following components were placed in a ball mill pot and dispersed to obtain an ink composition for forming an ink layer. The resulting ink composition was coated onto a polyimide film (a product of Du Pont-Toray Co., Ltd.) with a thickness of 8.5 μm, which serves as a support, by a wire bar, whereby an ink layer with a thickness of 3 μm was formed on the support as indicated by reference numeral 2-1 in FIG. 4.

| [Formulation of Ink Composition for Forming Ink Layer] | Parts by Weight |
|---|---|
| Polyvinyl butyral resin "BX-1" (Trademark, a product of Sekisui Chemical Co., Ltd.) | 10 |
| Sublimable dye "KAYASET BLUE 714" (Trademark, a product of Nippon Kayaku Co., Ltd.) | 10 |
| Diisocyanate "Coronate L" (Trademark, a product of Nippon Polyurethane Industry Co., Ltd.) | 2 |
| Solvents: | |
| Ethyl alcohol | 90 |
| Butyl alcohol | 90 |
| Isopropyl alcohol | 10 |

The following components were placed in a ball mill pot, and dispersed to obtain an ink composition for forming an additional ink layer. The resulting ink composition was coated onto the above-formed ink layer by a wire bar to form an additional ink layer with a thickness of 3 μm as indicated by reference numeral 2-2 in FIG. 4, whereby sublimation-type thermosensitive image transfer recording medium No. D-1 according to the present invention was prepared.

| [Formulation of Ink Composition for Forming Additional Ink Layer] | Parts by Weight |
|---|---|
| Polyvinyl butyral resin "BX-1" (Trademark, a product of Sekisui Chemical Co., Ltd.) | 10 |
| Sublimable dye "KAYASET BLUE 714" (Trademark, a product of Nippon Kayaku Co., Ltd.) | 10 |
| Silicone oil "SF8417" (Trademark, a product of Toray Silicone Co., Ltd.) | 2 |
| Solvents: | |
| Ethyl alcohol | 90 |
| Butyl alcohol | 90 |

-continued

| [Formulation of Ink Composition for Forming Additional Ink Layer] | Parts by Weight |
|---|---|
| Isopropyl alcohol | 10 |

EXAMPLE D-2

The procedure of Example D-1 was repeated except that the polyvinyl butyral resin "BX-1" (Trademark) used in both the ink layer and the additional ink layer was replaced by "Denka Butyral 5000A" (Trademark, a product of Denki Kagaku Kogyo K.K.) and the silicone oil "SF 8417" used in the additional ink layer was replaced by a paraffin wax having a softening point of 115° F. (a product of Nippon Seiro Co., Ltd.), whereby sublimation-type thermosensitive image transfer recording medium No. D-2 according to the present invention was prepared.

EXAMPLE D-3

The procedure of Example D-1 was repeated except that the polyvinyl butyral resin "BX-1" (Trademark) used in the ink layer was replaced by polyvinyl butyral resin "BL-1" (Trademark, a product of Sekisui Chemical Co., Ltd.), whereby sublimation-type thermosensitive image transfer recording medium No. D-3 according to the present invention was prepared.

The above-prepared sublimation type thermosensitive image transfer recording media Nos. D-1 through D-3 according to the present invention were subjected to a thermal recording test using a thermal head of a 6 dot/mm partial grace type and an image receiving sheet prepared by the following method:

A liquid for forming an image receiving layer having the following formulation was coated onto a synthetic paper with a thickness of 150 μm (a product of Oji-Yuka Synthetic Paper Co., Ltd.) by a wire bar to form an image receiving layer with a thickness of approximately 5 μm, whereby an image receiving sheet was prepared.

| [Formulation of Liquid for Forming Image Receiving Layer] | Parts by Weight |
|---|---|
| Polyester resin "Vylon 200" (Trademark, a product of Toyobo Co., Ltd.) | 20 |
| Silicone oil "SF 8417" (Trademark, a product of Toray Silicone Co., Ltd.) | 1 |
| Toluene | 50 |
| Methyl ethyl ketone | 50 |

Figure 5:
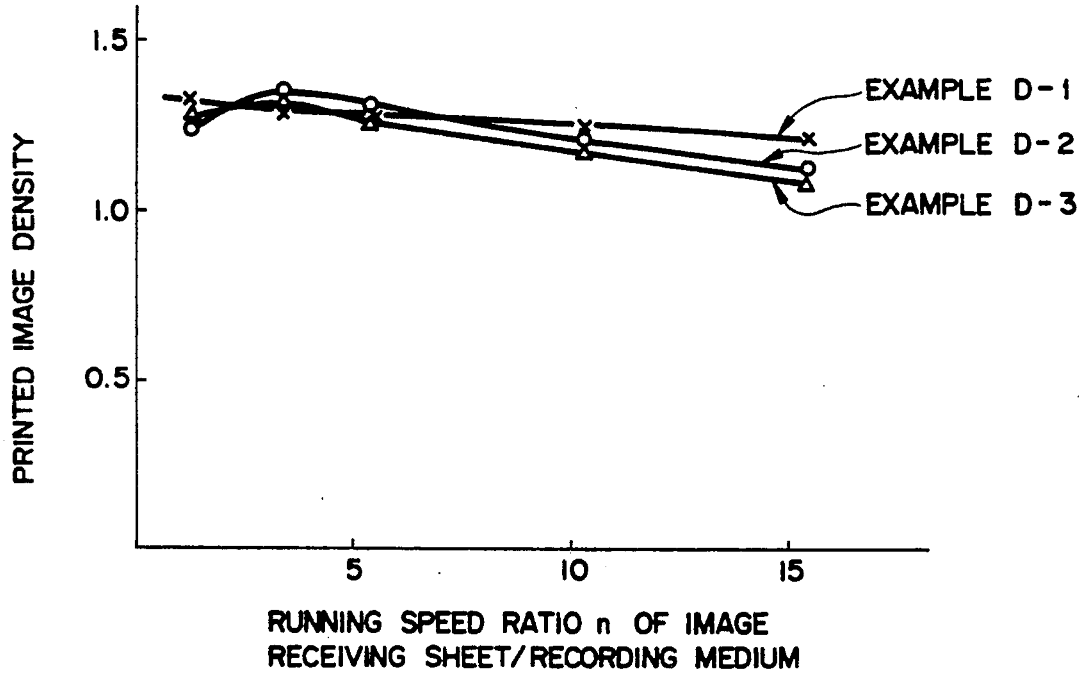
FIG. 5 is a graph showing the relationship between the ratio "n" of the running speed of an image receiving sheet to that of the sublimation-type thermosensitive image transfer recording medium as shown in FIG. 4 and the printed image density.

In this recording test, the applied power was 442 mW/dot, the maximum thermal energy applied from the thermal head was 2.21 mJ/dot, and the ratio "n" of the running speed of the image receiving sheet to that of the recording medium was changed from 1 to 15. The printed image density was measured by a Macbeth Densitometer RD-514. The results are shown in FIG. 5.

The recording method according to the present invention is a combination of the thermosensitive image transfer recording medium comprising an ink layer containing a sublimable dye dispersed in an organic binder resin in the form of granules and the n-time speed mode method in which the running speed of an image receiving sheet is n times faster than that of the recording medium. Therefore, the density of images printed by the recording method of the present invention hardly decreases with the increase of the value of "n", and multiple printing can thus be successfully achieved. Furthermore, the recording medium is free from exfoliation of the ink layer from the support and sticking to the image receiving layer, and does not bring about improper running of the ink sheet.

What is claimed is:

1. A thermosensitive recording method comprising the steps of:

(1) superimposing a sublimation-type thermosensitive image transfer recording medium on an image receiving sheet which image transfer recording medium comprises a support and an ink layer formed thereon, comprising a sublimable dye and one or more organic binder agents in which said sublimable dye is dispersed in the form of granules, wherein the size of the granules are sufficiently large to provide improved printed image density with an increase in the number of printing times, and (2) applying heat imagewise to said sublimation-type thermosensitive image transfer recording medium so as to transfer imagewise said sublimable dye form said image transfer recording medium to said image receiving sheet by a heat application means while moving said recording medium and said image receiving sheet in such a manner that the running speed of said image receiving sheet is greater than that of said image transfer recording medium.

2. The thermosensitive recording method as claimed in claim 1, wherein said ink layer further comprises a lubricant or a releasant.

3. The thermosensitive recording method as claimed in claim 1, wherein said support comprises a resin, and at least one of said organic binder agents in said ink layer is of the same type as said resin contained in said support.

4. The thermosensitive recording method as claimed in claim 2, wherein said support comprises a resin, and at least one of said organic binder agents in said ink layer is of the same type as said resin contained in said support.

5. The thermosensitive recording method as claimed in claim 1, wherein at least one of said organic binder agents in said ink layer comprises a reaction product between an isocyanate compound and a compound having an active hydrogen.

6. The thermosensitive recording method as claimed in claim 2, wherein at least one of said organic binder agents in said ink layer comprises a reaction product between an isocyanate compound and a compound having an active hydrogen.

7. The thermosensitive recording method as claimed in claim 1, further comprising an intermediate layer comprising an organic resin interposed between said support and said ink layer.

8. The thermosensitive recording method as claimed in claim 7, wherein said organic resin for said intermediate layer comprises a reaction product between an isocyanate compound and a compound having an active hydrogen.

9. The thermosensitive recording method as claimed in claim 7, wherein said organic resin for said intermediate layer and at least one of said organic binder agents in said ink layer are the same or of the same kind.

10. The thermosensitive recording method as claimed in claim 2, further comprising an additional ink layer between said support and said ink layer, said additional ink layer comprising a sublimable dye dispersed in the form of granules in a binder agent containing a reaction product between an isocyanate compound and a compound having an active hydrogen.

11. The thermosensitive recording method as claimed in claim 10, wherein said additional ink layer has a thickness of 0.5 μm to 10 μm.

12. The thermosensitive recording method as claimed in claim 10, wherein said ink layer has a thickness of 0.5 μm to 10 μm.

13. The thermosensitive recording method as claimed in claim 1, wherein the diameter of said granules of said sublimable dye is in the range of 1.0 μm to 20 μm.

14. The thermosensitive recording method as claimed in claim 1, wherein the concentration of said sublimable dye is 5 wt.% to 80 wt.% of the total weight of said ink layer.

15. The thermosensitive recording method as claimed in claim 1, wherein said organic binder agent is a thermoplastic resin having a softening point of 100° C. to 250° C.

16. The thermosensitive recording method as claimed in claim 1, wherein said ink layer has a thickness of 1 μm to 20 μm.

17. The thermosensitive recording method as claimed in claim 1, wherein the diameter of said granules of said sublimable dye is in the range of 1.0 to 10 μm.

18. The thermosensitive recording method as claimed in claim 1, wherein said ink layer has a thickness of 1 μm to 8 μm.

* * * * *

UNITED STATES PATENT AND TRADEMARK OFFICE
CERTIFICATE OF CORRECTION

PATENT NO. : 5,144,334

DATED : September 1, 1992

INVENTOR(S) : Akira SUZUKI et al

It is certified that error appears in the above-identified patent and that said Letters Patent is hereby corrected as shown below:

Column 1, line 22, delete ";" (semi-colon); and
line 63, change "overlapped" to --overlapping--.

Column 2, line 30, change "a steps" to --the steps--; and
line 52, change "wiht" to --with--.

Column 3, line 44, change "bider" to --binder--.

Column 8, line 38, after "thereto" insert --of--.

Column 9, line 48, delete ")".

Column 14, line 7, after "receiving" insert --layer--.

Column 17, line 30, change "sublimation type" to -sublimation-type--.

Column 19, line 29, change "sublimation type" to -sublimation-type--; and
line 33, change "dot/mm partial" to --dot/mm - partial--.

Signed and Sealed this

Twenty-first Day of December, 1993

Attest:

BRUCE LEHMAN

*Attesting Officer* — *Commissioner of Patents and Trademarks*